Dec. 12, 1950     L. H. ERICKSON     2,533,567
ELECTRONIC CONTROL CIRCUITS
Filed Nov. 15, 1947
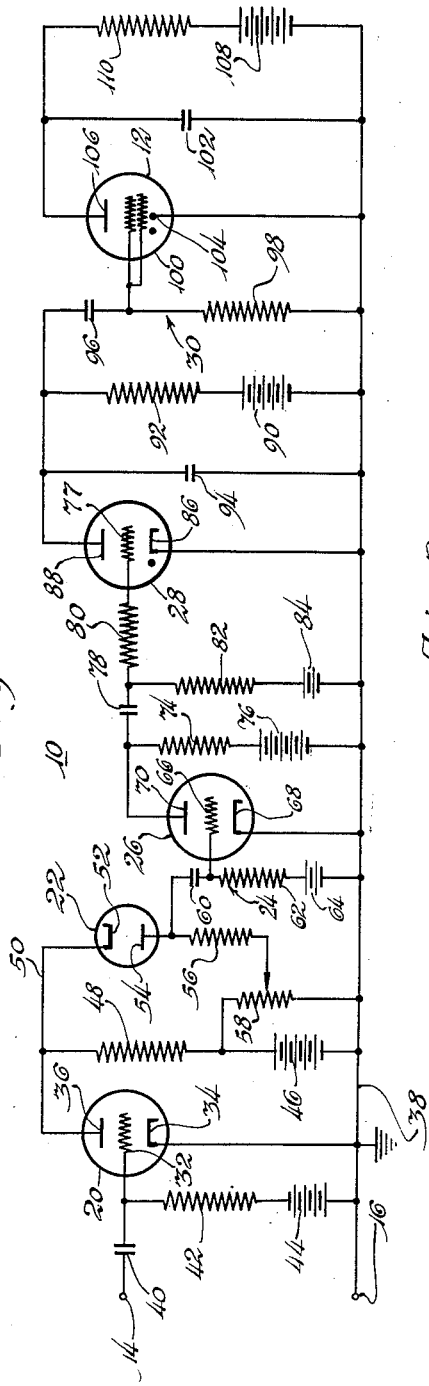
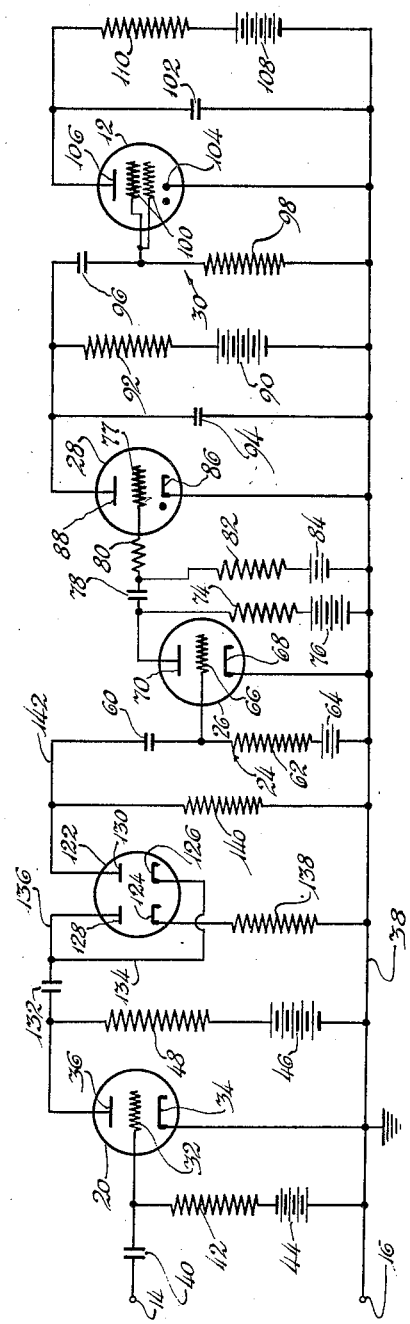
Inventor:
Lowell H. Erickson
BY Hinkle, Horton, Akeberg, Haumann & Wupper
Attorneys.

Patented Dec. 12, 1950

2,533,567

UNITED STATES PATENT OFFICE 2,533,567

ELECTRONIC CONTROL CIRCUITS

Lowell H. Erickson, Denver, Colo., assignor to Marcellus S. Merrill, Denver, Colo.

Application November 15, 1947, Serial No. 786,214

11 Claims. (Cl. 315—227)

1

The present invention relates to new and improved electronic control circuits, and more particularly to circuits adapted to modify cyclic alternating current wave forms, such as sinusoidal, to provide a single sharp peaked impulse at a definite point in each cycle.

The circuits of the present invention are adapted particularly for use with apparatus for balancing automobile wheels or other rotating bodies, but they may be used for other purposes. The balancing apparatus may be utilized for locating the locus of unbalance and determining its amount. In known types of apparatus, means associated with the rotating body are provided to generate a generally sinusoidal alternating current having a definite phase relationship with the vibration of the body. It also includes an electronic circuit for modifying the alternating current to produce a sharp peak or impulse occurring once each cycle for the purpose of triggering or firing an electronic stroboscopic device. Because of the known predetermined relationship of the time of firing the device relative to the direction of vibration of the unbalanced body at that time, the locus of unbalance is determinable by visual observation.

The present invention has for its object the provision of new and improved electronic circuits for producing triggering impulses in response to cyclic control voltages, and which impulses may be utilized to fire a stroboscopic device.

Another object of the present invention resides in the provision of a new and improved triggering impulse supplying electronic control circuit which is reliable in operation over a wide range of frequencies and amplitudes of control voltages.

A further object of the present invention is to provide a control circuit of the foregoing character, which is not likely to become blocked and thus rendered inoperative, and in which an undue amount of amplification is not necessary to insure reliable firing of the stroboscopic device.

Other objects and advantages of the present invention will become apparent from the ensuing description of illustrative embodiments thereof, in the course of which reference is had to the accompanying drawings, in which:

Figs. 1 and 2 are schematic representations of two embodiments of the invention.

Referring first to Fig. 1, the electronic control circuit 10 of the present invention is utilized for the purpose of firing a stroboscopic device which may be of the electronic type, such as tube 12, in synchronism with a cyclic signal or control voltage applied to the circuit input terminals 14 and 16. The tube 12 may be a grid controlled cold cathode gas tube and the signal voltage may be supplied from a suitable source such as an electromagnetic pickup associated with the rotating body to be balanced producing an alternating current having substantially a sinusoidal wave form.

The circuit includes an amplifier tube 20, a rectifier tube 22, a differentiating circuit 24, a second amplifier tube 26, a circuit for eliminating unwanted pulses, which may be a grid controlled relaxation circuit including a thyratron tube 28, a second differentiating circuit 30, and the gas tube 12.

The cyclic control voltage is supplied to the grid 32 of tube 20, which is a triode having also a cathode 34 and an anode 36. The cathode is connected to a grounded common conductor 38 connected to input terminal 16. The grid is coupled to terminal 14 through a coupling capacitor 40 and it is also connected to the grid leak resistor 42 and biasing means which may be a battery 44. The anode is supplied with potential from battery 46 through resistor 48.

In accordance with one of the features of the present invention, the rectifier 22 is coupled directly to the amplifier by conductor 50. It is shown as a half wave rectifier passing only the negative half cycles, as the cathode 52 is connected to conductor 50. The anode 54 is connected to the common conductor 38 through resistor 56, at the anode end of which a negative voltage appears. The resistor 56 is in series with a desired portion of a potentiometer resistor 58 connected across battery 46 and preferably adjusted so that only the negative half cycles of the signal voltage pass through tube 22. However, as pointed out hereinafter, the rectifier can be arranged to pass only the positive half cycles and the resulting positive voltage can be used.

The half cycle voltage waves appearing across resistor 56, which are negative half cycles in the illustrated arrangement, are differentiated by the differentiating circuit 24, which includes the series connected capacitor 60 and resistor 62. The latter is connected to the common conductor through a battery 64 supplying bias to the grid 66 of the amplifier tube 26, which is connected to the junction of capacitor 60 and resistor 62.

The differentiated wave is amplified by tube 26 which has its cathode 68 connected to the common conductor and its anode 70 connected to the anode battery 76 through resistor 74.

In accordance with a further feature of the present invention, the positive half cycle of the differentiated and amplified wave is utilized to produce a pulse. The means for doing this includes, preferably but not necessarily, the thyratron 28 which has its grid 77 coupled to the anode of tube 26 through the coupling capacitor 78 and resistor 80. The grid is also connected to ground through resistor 82 and the bias battery 84. The use of a thyratron at this point eliminates otherwise necessary amplification and means for eliminating the unwanted negative peaks The cathode 86 of the tube is connected to the common conductor 38 and its anode 88 is connected to battery 90 through resistor 92. Each time the tube is fired in response to a positive peak, a capacitor 94 in shunt therewith discharges through the tube, with the result that the plate voltage is reduced to produce a negative wave or pulse.

This negative wave is differentiated by circuit 30 and used to actuate the stroboscopic device, e. g., to fire the tube 12. The differentiating circuit 30 includes capacitor 96 and resistor 98, the junction of which is connected to the grids 100 of tube 12. When the tube is fired, a normally charged capacitor 102 discharges through the tube, it being connected across the cathode 104 and anode 106. The capacitor is charged by battery 108 through resistor 110.

In operation, a cyclic and generally sinusoidal control voltage is applied across the terminals 14 and 16. The voltage is amplified by tube 20 and then rectified by tube 22. The latter is so connected that only the negative half cycles pass through the tube and the negative voltage waves appearing across resistor 56 are differentiated by circuit 24 and then amplified by tube 26. The positive half cycles of the differentiated and amplified wave fire the gas tube 28 with the result that there is a negative voltage pulse appearing at the plate of the tube for each full cycle of the input signal. This negative pulse is differentiated by circuit 30 and the differentiated negative pulses are utilized to fire the tube 12. The circuit is simple in construction and it is reliable in operation over a wide range of frequencies and amplitudes of the input signal. As already indicated, the rectifier 22 could be arranged to pass the positive half cycles. When this is done, then in order to render the gas tube 28 conductive in response to the positive half cycles, it is necessary either to add another stage of amplification following tube 26 or to eliminate tube 26.

The embodiment of the invention illustrated in Fig. 2 is similar to that of Fig. 1, and like elements have been indicated by like reference characters. The primary difference between the two resides in the rectifier and the manner in which it is coupled to the first and second amplifier tubes 20 and 26.

In Fig. 2, a double rectifier tube 122 is used. It includes a pair of cathodes 124 and 126 and a pair of anodes 128 and 130. The rectifier is coupled to the first amplifier tube 20 through a coupling capacitor 132 and the elements of the tube are reversely connected. Thus, the cathode 126 and the anode 128 are connected by conductors 134 and 136, respectively, to the capacitor 132, with the result that current flows in opposite directions through the rectifier elements in response to opposite half cycles of the amplified input signal voltage. The cathode 124 is connected through resistor 138 to the common conductor so that the positive half cycle appears across that resistor. The negative half cycles appear across resistor 140 which is connected across the common conductor 38 and the anode 130, the resistor and anode being connected by conductor 142 to capacitor 60. The negative half cycles are thus differentiated and applied to the grid 66 of amplifier tube 26 in the same manner as the negative half cycles appearing across resistor 56 in the previous embodiment.

Even though a coupling capacitor, the capacitor 132 is disposed between the rectifier and the first amplifier, this capacitor will not become blocked because of the action of the rectifier section 124, 126, which prevents the building up of a considerable negative potential on the capacitor.

The operation and advantages of the circuit of Fig. 2 are like those of the embodiment of Fig. 1, and it is believed that further detailed description thereof is unnecessary.

While but two embodiments of the present invention have been illustrated and described in detail, it should be understood that the specific details thereof are not intended to be limitative of the invention except in so far as set forth in the accompanying claims.

Having thus described my invention, what I claim as new and desire to secure by Letters Patent of the United States, is:

1. An electronic circuit for triggering a stroboscopic device in response to a cyclic control voltage including amplifying means for amplifying said control voltage, means including rectifying means coupled to said amplifying means for producing voltage waves of one polarity, differentiating means coupled to said last mentioned means for differentiating said waves, amplifying means coupled to said differentiating means for amplifying the differentiated waves, means including a grid controlled gas tube coupled to said last mentioned amplifying means and adapted to be triggered in response to positive portions of the amplified voltage waves for producing voltage pulses, differentiating means coupled to said gas tube, and an electronic stroboscopic device coupled to said last mentioned differentiating means and triggered by said differentiated voltage pulses.

2. An electronic circuit for triggering a stroboscopic device in response to a cyclic control voltage including amplifying means for amplifying said control voltage, means including rectifying means coupled to said amplifying means for producing negative voltage waves, differentiating means coupled to said last mentioned means for differentiating said waves, amplifying means coupled to said differentiating means for amplifying the differentiated waves, means including a grid controlled gas tube coupled to said last mentioned amplifying means and adapted to be triggered in response to positive portions of the amplified voltage waves for producing negative voltage pulses, differentiating means coupled to said gas tube, and an electronic stroboscopic device coupled to said differentiating means triggered by said differentiated negative voltage pulses.

3. An electronic circuit for triggering a stroboscopic device in response to a cyclic control voltage including rectifying means supplied with said control voltage for producing voltage waves of one polarity, differentiating means coupled to said last mentioned means for differentiating said waves, means including a grid controlled rectifier tube supplied with said last differentiated waves and operable in response to positive portions of said waves only for producing voltage pulses, differentiating means coupled to said tube, and a stroboscopic device coupled to said last mentioned differentiating means and triggered by the differentiated voltage pulses supplied by it.

4. An electronic circuit for triggering a stroboscopic device in response to a cyclic control voltage including rectifying means supplied with said control voltage for producing negative voltage waves, differentiating means coupled to said last mentioned means for differentiating said waves, means including a grid controlled gas tube supplied with said last differentiated waves and adapted to be triggered in response to positive portions of said waves for producing negative voltage pulses, differentiating means coupled to said gas tube, and an electronic stroboscopic device coupled to said differentiating means triggered by said differentiated negative voltage pulses.

5. An electronic circuit for triggering a stroboscopic device in response to a cyclic control voltage including amplifying means for amplifying said control voltage, means including rectifying means coupled to said amplifying means for producing negative voltage waves, differentiating means coupled to said last mentioned means for differentiating said waves, amplifying means coupled to said differentiating means for amplifying the differentiated wave, means including a grid controlled gas tube coupled to said last mentioned amplifying means adapted to be triggered in response to positive portions of the amplified voltage waves and a capacitor adapted to be discharged through said tube for producing negative voltage pulses, differentiating means coupled to said gas tube, and an electronic stroboscopic device coupled to said differentiating means triggered by said differentiated negative voltage pulses.

6. An electronic circuit for triggering a stroboscopic device in response to a cyclic control voltage including a half wave rectifier supplied with a cyclic control voltage for supplying half cycle voltage waves of one polarity, differentiating means supplied with said half cycle voltage waves for differentiating said waves, means including a grid controlled trigger tube supplied with said differentiated waves for supplying voltage pulses, differentiating means supplied with said voltage pulses, and a stroboscopic device coupled to said last mentioned differentiating means and triggered by the differentiated voltage pulses supplied by it.

7. An electronic circuit for triggering a stroboscopic device in response to a cyclic control voltage, including amplifying means for amplifying said control voltage, means including a diode having its cathode directly connected to said amplifying means and including a resistor connected to the anode of said diode for producing voltage waves with one polarity, differentiating means coupled to said resistor for differentiating said waves, amplifying means coupled to said differentiating means for amplifying the differentiated waves, means including a grid controlled gas tube coupled to said last mentioned amplifying means and adapted to be triggered in response to positive portions of the amplified voltage waves for producing voltage pulses, a second differentiating means coupled to said gas tube, and an electronic stroboscopic device coupled to said second differentiating means and triggered by said differentiated voltage pulses.

8. An electronic circuit for triggering a stroboscopic device in response to a cyclic control voltage, including amplifying means for amplifying said control voltage, a capacitor, means including a pair of diode rectifiers reversely coupled by said capacitor to said amplifying means and including a resistor connected to the anode of one of said diodes for producing voltage waves of one polarity, differentiating means coupled to said resistor for differentiating said waves, amplifying means coupled to said differentiating means for amplifying the differentiated waves, means including a grid controlled gas tube coupled to said last mentioned amplifying means and adapted to be triggered in response to positive portions of the amplified voltage waves for producing voltage pulses, a second differentiating means coupled to said gas tube and an electronic stroboscopic device coupled to said second differentiating means and triggered by said differentiated voltage pulses.

9. An electronic circuit for triggering a stroboscopic device at the beginning of each alternate half cycle of a generally sinusoidal control signal supplied by a source, comprising a half wave rectifier having an input coupled to the source and having a substantially resistive load circuit for transmitting all the portions of the signal having one polarity only, differentiating means having an input coupled to said load circuit of said rectifier and having an output supplying a differentiated signal, an electronic trigger device having an input coupled to the output of said differentiating means and adapted to supply a pulse at its output in response to one polarity portion only of each cycle of said differentiated signal, differentiating means having its input coupled to the output of said trigger device and having an output, and means coupling the output of said differentiating means with the stroboscopic device.

10. An electronic circuit for triggering a stroboscopic device at the beginning of each alternate half cycle of a generally sinusoidal control signal supplied by a source, comprising a half wave rectifier having an input coupled to the source and having a substantially resistive load circuit for transmitting all the portions of the signal having one polarity only, differentiating means having an input coupled to said load circuit of said rectifier and having an output supplying a differentiated signal wave, an electronic trigger device having an input coupled to the output of said differentiating means and adapted to supply pulses at its output in response to similar portions of successive cycle of said differentiated signal wave, and means coupling the output of said trigger device with the stroboscopic device.

11. An electronic circuit for triggering a stroboscopic device at the beginning of each alternate half cycle of a generally sinusoidal control signal supplied by a source, comprising a half wave rectifier having an input coupled to the source and having a substantially resistive load circuit for transmitting all the portions of the signal having one polarity only, differentiating means having an input coupled to said load circuit of said rectifier and having an output supplying a differentiated signal wave, a grid controlled rectifier device having an input coupled to the output of said differentiating means and adapted to supply pulses at its output in response to similar portions of successive cycles of said differentiated signal wave, differentiating means having its input coupled to the output of said grid controlled rectifier device and having an output, and means coupling the output of said differentiating means with the stroboscopic device.

LOWELL H. ERICKSON.

REFERENCES CITED

The following references are of record in the file of this patent:

UNITED STATES PATENTS

| Number | Name | Date |
|---|---|---|
| 2,113,011 | White | Apr. 5, 1938 |
| 2,360,857 | Eldredge | Oct. 24, 1944 |
| 2,408,078 | Labin et al. | Sept. 24, 1946 |
| 2,449,651 | Hathaway | Sept. 21, 1948 |